United States Patent Office 3,408,362
Patented Oct. 29, 1968

3,408,362
N-SUBSTITUTED PYRAZOLES
Jean Druey, Riehen, and Paul Schmidt, Therwil, Switzerland, assignors to Ciba Corporation, a corporation of Delaware
No Drawing. Application May 26, 1959, Ser. No. 815,824, now Patent No. 3,187,006, dated June 1, 1965, which is a continuation-in-part of abandoned application Ser. No. 775,356, Nov. 21, 1958, which in turn is a continuation-in-part of abandoned application Ser. No. 637,895, Feb. 4, 1957. Divided and this application May 3, 1965, Ser. No. 452,908
Claims priority, application Switzerland, Feb. 10, 1956, 29,762; Apr. 7, 1956, 31,859; July 16, 1956, 35,476; Sept. 28, 1956, 37,936; Jan. 2, 1957, 41,224; Nov. 26, 1957, 53,081; Mar. 28, 1958, 57,621; May 30, 1958, 60,080; June 13, 1958, 60,541; Jan. 22, 1959, 68,600; Apr. 3, 1959, 71,540; Apr. 9, 1959, 71,799
The portion of the term of the patent subsequent to June 1, 1982, has been disclaimed
3 Claims. (Cl. 260—310)

This is a division of our copending application Ser. No. 815,824, filed May 26, 1959, now U.S. Patent 3,187,006 which itself is a continuation in part of our copending application Ser. No. 775,356, filed Nov. 21, 1958 (now abandoned) which itself is a continuation in part of our copending application Ser. No. 637,895, filed Feb. 4, 1957 (now abandoned).

In our copending application Ser. No. 637,898, filed Feb. 4, 1957, now U.S. Patent 2,868,803, there is described a process, wherein α-cyano-α-formyl-acetic acid esters or their reactive aldehyde derivatives are reacted with hydrazine to yield 1-unsubstituted 5-amino-pyrazole-4-carboxylic acid esters which are valuable intermediates for the preparation of 1-unsubstituted 4-hydroxy-pyrazolo [3,4-d]pyrimidines.

We have now found that this reaction can also be performed with mono-substituted hydrazines and not only with α-cyano-α-formyl-acetic acid esters or their reactive aldehyde derivatives, such as enol ethers, acetals or mercaptals but quite generally with α-cyano-α-acetic acid or its acid derivatives, or the reactive aldehyde derivatives thereof such as are mentioned above. Acid derivatives to be used are primarily those which contain an oxo, thioketo, or amino group, such as esters, amides or amidines but also other derivatives may be used, such as the nitrile. Esters are preferably those of alkanols, such as lower alkanols, e.g. methanol, ethanol, propanol or butanol.

In a preferred embodiment of our invention there are used for the reaction an alkoxy-methylene-cyano-acetic acid or its acid derivatives, such as esters, preferably lower alkyl esters, or the amide, thioamide, amidine or nitrile.

The mono-substituted hydrazines used for the reaction are preferably hydrazines mono-substituted by aliphatic or cyclo-aliphatic hydrocarbon radicals, such as monoalkyl-, monocyclo-alkyl- or mono-(oxy- or oxa-alkyl)-hydrazines, mono-aryl-hydrazines, or mono-heterocyclhydrazines, especially those in which the alkyl radicals are of low molecular weight, e.g. methyl, ethyl or β-hydroxy-ethyl, the aryl radical is a phenyl radical, e.g. phenyl, halogenophenyl, such as p-chloro- or p-bromophenyl, alkylphenyl or nitrophenyl and the heterocyclic radical is a monocyclic nitrogen-containing heterocyclic radical, such as a pyridyl radical, e.g. the pyridyl-(2) radical. In a preferred embodiment of our invention there is used isopropyl-hydrazine.

The condensation of the α-cyano-α-formyl-acetic acid or its derivatives with mono-substituted hydrazines takes place under mild conditions, partly at room temperature, and is an exothermic reaction. It is also possible to work at higher temperature and in the presence of an acid. The use of a diluent, such as an alcohol, toluene or chloroform, is of advantage. Although there are several possibilities for the reactants to combine, we have found that uniformly 1-substituted 5-amino-4-R-pyrazoles are obtained wherein R represents the carboxyl group or its derivatives. The reaction therefore proceeds according to the following scheme, illustrated for an enol ether derivative:

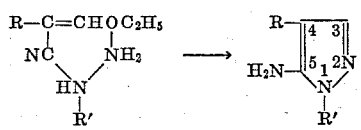

wherein R' represents the substituent of the hydrazine.

Another object of the invention is a new process by which it is possible to prepare the new 1-substituted 3-amino-pyrazoles containing in 4-position a free or functionally converted carboxyl group which compounds are not accessible in the above described reaction. This process is characterized by the fact that 2-cyano-β-oxo-propionic acids or their reactive acid and/or oxo derivatives are condensed with N-monosubstituted hydrazines carrying at the N'-nitrogen atom a radical which can be hydrolyzed off, the compounds obtained are treated with hydrolyzing agents to split off said radical, and the ring is closed simultaneously with the hydrolysis or thereafter. As functional acid and/or oxo derivatives of the starting materials those mentioned above may be employed. The use of α-cyano-2-formyl acetic acid esters, amides, thioamides, amidines or nitriles, especially in the form of their enol ethers is preferred. As principal starting materials of this kind there should be mentioned alkoxy-methylene-cyanoacetic acid lower alkyl esters, the amides and the nitriles, e.g. ethoxy-methylene-cyanoacetic acid ethyl ester or the corresponding nitrile.

As N-substituents of the hydrazines used as starting materials those mentioned above are preferred. The radical at the N'-nitrogen atom of the hydrazine is preferably an acyl radical, such as the acyl radical of an aliphatic carboxylic acid, e.g. a lower alkanoyl radical, such as acetyl, propionyl or butyryl; or it is a methylidene radical, such as an arylidene radical, the aryl radical of which may be substituted, such as a benzylidene, p-alkylbenzylidene, p-halogeno-benzylidene or p-alkoxy-benzylidene radical, or an alkylidene, e.g. ethylidene.

The condensation of the hydrazines with α-cyano-β-oxo-propionic acids or their derivatives takes place in the presence or absence of a condensing agent and/or catalyst, advantageously at a raised temperature and preferably in the presence of a diluent, such as an alcohol, e.g. ethanol, an aromatic hydrocarbon, e.g. benzene or toluene, or a halogenated aliphatic hydrocarbon, e.g. chloroform.

The hydrolysis is advantageously carried out with an acid, working for example, in an aqueous alcoholic medium, e.g. with alcoholic hydrochloric acid; in the last mentioned case the hydrolysis can be an alcoholysis, ring closure to the desired 1-substituted 3-amino-pyrazole derivative occurring simultaneously. Resulting open-chain hydrolysis products can, if desired, be subjected to ring closure in the customary manner in the presence of an acid or alkaline condensing agent.

In the compounds thus obtained a free carboxyl group can be modified in the usual manner, for example esterified or amidated. Modified carboxyl groups, such as esterified carboxyl groups or nitrile groups, can be converted into free or different modified carboxyl groups. Thus, the nitrile group can be hydrolyzed to the carbamyl group, or an esterified carboxyl group to the free carboxyl group.

The new 1-substituted pyrazoles obtained by the above new processes of our invention provide another object of this invention. The invention relates particularly to those having the formulae

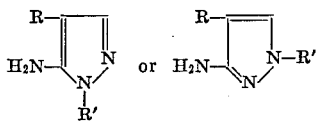

wherein R stands for a carboxyl group or a derivative thereof and R' for the substituent of the hydrazine used for the reaction such as an alkyl, oxaalkyl, hydroxyalkyl, cycloalkyl, aryl or heterocyclic radical, e.g. methyl, ethyl, propyl, isopropyl, 2-methyl-butyl-(3), butyl-(2), pentyl-(2), pentyl-(3), heptyl-(2), 3-oxa-heptyl-(6), cyclopentyl, cyclohexyl, β-hydroxyethyl, phenyl, halogeno phenyl, alkyl phenyl, nitrophenyl, lower alkoxy phenyl, pyridyl-(2), lower alkyl-pyridyl-(2) and the like.

These compounds are valuable intermediate products. Of outstanding importance are those compounds in which R represents a carbalkoxy, e.g. carbomethoxy or carbethoxy group or an amide, thioamide or amidine group, or a nitrile group and R' represents the isopropyl-radical. The new compounds can be reacted with carboxylic acids or acid derivatives thereof, such as anhydrides, amides, thioamides or halides to yield pyrazolo[3,4-d]pyrimidines, provided that either R or the acid derivative used for the reaction with the pyrazole contains an amino group. Thus, N-substituted 5-amino-4-R-pyrazoles in which R represents a carbalkoxy group, or the nitrile group, may be reacted with amides or thioamides of carboxylic acids, such as carbonic, formic or acetic acid, e.g. urea, thiourea, formamide or acetamide, to yield the corresponding 4-hydroxy- or 4-amino-pyrazolo[3,4-d]pyrimidines respectively. Compounds in which R represents the amide or amidine group, may be reacted also with acid anhydrides or halides, such as phosgene, a chloroformic acid ester or acetic acid anhydride to yield 4-hydroxy- or 4-amino-pyrazolo[3,4-d]pyrimidines, respectively. Such reactions are described in our copending applications Serial No. 637,897, filed Feb. 4, 1957 (now U.S. Patent No. 2,965,643) and Ser. No. 775,334, filed Nov. 21, 1958 (now abandoned).

The condensation to form the pyrazolo-pyrimidines is carried out preferably at temperatures above 100° C., if desired in the presence of a diluent and/or a condensing agent in an open vessel or under pressure. The resulting pyrazolo[3,4-d]pyrimidines can be substituted in conventional manner, especially at the ring nitrogen atoms, or the substituents that are present can be converted into other substituents. Thus hydroxyl or mercapto groups may be etherified or esterified, or may be exchanged for halogen atoms or hydroxyl groups may be replaced by sulfur atoms. The halogen atoms can be exchanged for hydroxyl groups or etherified hydroxyl or mercapto groups or by amino or hydrazino groups or hydrogen. It is also possible to treat the resulting compounds with reactive esters of alcohols, as for example with alkyl halides or dialkyl sulfates to form derivatives substituted at the nitrogen, at the oxygen and/or at the sulfur atom. Hydroderivatives can also be obtained by treatment with hydrogenating agents, such as catalytically activated hydrogen. These conversions are made in per se conventional manner.

The 4-hydroxy-pyrazolo[3,4-d]pyrimidines and their derivatives thus obtained have valuable pharmacological properties and can be used as medicaments, e.g. as stimulants and diuretics. Especially valuable are compounds obtained from N-isopropyl-5-amino-4-R-pyrazoles. 4-halogeno-pyrazolo[3,4-d]pyrimidines obtainable from the corresponding 4-hydroxy compounds have pronounced antibacterial and fungistatic properties, e.g. against Staphylococcus aureus. The preparation of these compounds is disclosed in our above mentioned copending applications.

A specific group of N-substituted pyrazoles represents a particular and especially valuable embodiment of the invention. This embodiment provides 5- (or 3-) amino-4-cyano-1-substituted pyrazoles.

These 5- (or 3-) amino-4-cyano-pyrazoles, besides being important intermediates as pointed out before, possess valuable pharmacological properties. They exhibit more especially a sedative action, and are therefore useful as medicaments. Particularly useful as sedatives are the compounds of the formula

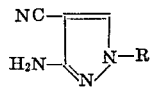

and, even more preferred, those of the formula

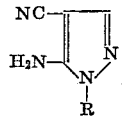

in which R represents an aliphatic or cycloaliphatic hydrocarbon radical containing at least 3 carbon atoms, and also salts of these compounds.

Suitable aliphatic or cycloaliphatic hydrocarbon radicals are especially those containing 3-12 carbon atoms, and preferably straight chain or branched chain propyl, butyl, pentyl or hexyl radicals or cyclopentyl or cyclohexyl radicals.

Especially valuable in this connection are 1-(butyl-2')-5-amino-4-cyano-pyrazole of the formula

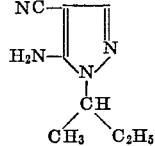

and its salts.

These N-substituted 5-amino-4-cyano-pyrazoles, their salts or mixtures thereof can be used, for example, in the form of pharmaceutical preparations. These preparations contain the active compound in admixture with a pharmaceutical organic or inorganic carrier suitable for enteral or parenteral administration. As carriers there are used substances which do not react with the new compounds, for example, water, gelatine, lactose, white petroleum jelly, starches, magnesium stearate, talc, vegetable oils, benzyl alcohols, gums, polyalkylene glycols, cholesterol or other carrier known for medicaments. The pharmaceutical preparations may be, for example, in the form of tablets, dragees, or in liquid form as solutions, suspensions or emulsions. If desired, they may be sterilized and/or may contain auxiliary substances, such as preserving, stabilizing, wetting or emulsifying agents. They may also contain other therapeutically valuable substances. The preparations can be made up by the methods in themselves known.

From the products of this invention, salts can be prepared in the usual manner. From 5- (or 3-) amino-pyrazole-4-carboxylic acids, metal salts, such as alkaline metal, earth alkaline metal or ammonium salts can be obtained. From the compounds with an esterified carboxyl group or another modified carboxyl group, acid addition salts can be prepared by reaction with inorganic or organic acids, as for example with hydrohalic acids, sulfuric acids, nitric acid, perchloric acid, phosphoric acid, formic acid, acetic acid, propionic acid, lactic acid, oxalic acid, succinic acid, malic acid, tartaric acid, citric acid, ascorbic acid, methane sulfonic acid, ethane sulfonic acid, hydroxyethane sulfonic acid, benzoic acid, salicylic acid, p-aminosalicylic acid, toluene sulfonic acid or naphthalene sulfonic acids.

The following examples illustrate the invention, the parts being by weight, unless otherwise stated and the

Example 1

17 parts of ethoxy-methylene-cyanacetic acid ethyl ester are dissolved in 100 parts by volume of ethyl alcohol. The solution is then slowly mixed with a solution of 10.8 parts of phenyl-hydrazine in 50 parts of volume of ethylalcohol. In order to complete the reaction the mixture is heated at the boil for 2 hours. The mixture is then evaporated to dryness, and the reddish oil which remains behind is crystallized by the addition of benzene. By recrystallization from ethyl acetate with the addition of animal charcoal there is obtained 1-phenyl-5-amino-4-carbethoxy-pyrazole of the formula

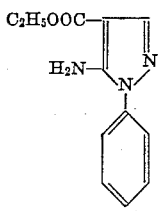

in the form of white crystals melting at 99–101° C.

It can be converted into 1-phenyl-4-hydroxyl-pyrazolo [3,4-d]pyrimidine in the following manner.

12 parts of 1-phenyl-5-amino-4-carbethoxy-pyrazole are heated with 40 parts by volume of formamide for 8 hours in a bath having a temperature of 200–210° C. After being cooled, the mixture is filtered with suction to remove the precipitated crystalline precipitate, the latter is dissolved in a 2N-solution of caustic soda, treated with animal charcoal and precipitated, by adjusting to a pH value of 3 with 2N-hydrochloric acid. 1-phenyl-4-hydroxy-pyrazolo[3,4-d]pyrimidine is obtained in the form of crystals melting at 286–288° C.

From this compound, the 1-phenyl-4-chloro-pyrazolo [3,4-d]pyrimidine, the 1 - phenyl-4-furfurylamino - pyrazolo[3,4-d]pyrimidine, and the 1 - phenyl - 4 - diethylaminoethylamino-pyrazolo[3,4-d]pyrimidine can be obtained as follows:

8 parts of 1-phenyl-4-hydroxy-pyrazolo[3,4-d]pyrimidine are heated with 40 parts by volume of phosphorus oxychloride for 2 hours at the boil. The phosphorus oxychloride is evaporated from the mixture and the residue is poured on to ice. The mixture is adjusted to a pH value of 8 with a 2N-solution of caustic soda and extracted with benzene. The benzene residue is recrystallized from boiling ligroin and there is obtained 1-phenyl-4-chloro-pyrazolo[3,4-d]pyrimidine in the form of white crystals melting at 125–126° C.

23 parts of 1-phenyl-4-chloro-pyrazolo[3,4-d]pyrimidine and 13 parts of aminoethyl-diethylamine are introduced into 500 parts by volume of toluene, and the mixture is boiled for 6 hours under reflux. The mixture is then evaporated to dryness in vacuo and the residue is crystallized from ethyl acetate. There is obtained the monohydrochloride of 1 - phenyl-4-diethylaminoethyl-amino-pyrazolo[3,4-d]pyrimidine in white crystals melting at 141–143° C. It is active against *Staphylococcus aureus* and can be used as disinfectant or medicament.

23 parts of 1-phenyl-4-chloro-pyrazolo[3,4-d]pyrimidine and 20 parts of furfurylamine are introduced into 500 parts by volume of toluene, and the mixture is boiled for 10 hours under reflux. The whole is allowed to cool, filtered with suction to remove the crystalline precipitate, and a sample is crystallized from boiling ligroin. There is obtained 1-phenyl-4-furfurylamino-pyrazolo[3, 4-d]pyrimidine in the form of white crystals melting at 158–160° C. The residue is boiled with 2N-hydrochloric acid and the hydrochloride so obtained melts at 201–203° C.

Example 2

24.4 parts of ethoxymethylenemalonic acid dinitrile are dissolved in 250 parts by volume of ethyl alcohol. The solution is then slowly mixed with 22 parts of phenylhydrazine and heated to the boil for 10 hours. The reaction mixture is allowed to cool, whereupon a crystalline product precipitates which is separated by filtration. By recrystallization from alcohol there is obtained 1-phenyl-5-amino-4-cyano-pyrazole of the formula

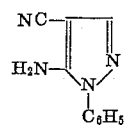

in the form of crystals of melting point 135–137° C.

This product can be converted into the corresponding amide in the following manner:

100 parts by volume of 2N-caustic soda solution are added to a solution of 5 parts of 1-phenyl-5-amino-4-cyano-pyrazole in 100 parts by volume of alcohol, and the whole is heated to the boil for 3 hours. The alcohol is then expelled under reduced pressure, a solid product precipitating. The latter is recrystallized to obtain 1-phenyl-5-amino-4-carbamyl-pyrazole of the formula

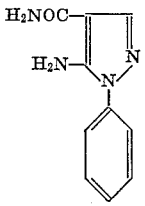

in the form of crystals of melting point 167–168° C. From this compound 1-phenyl-4,6-dihydroxy-pyrazolo [3,4-d]pyrimidine can be obtained as follows:

5 parts of 1-phenyl-5-amino-4-carbamyl-pyrazole and 9 parts of urea are mixed thoroughly and then heated on an oil bath of 190° C. for half an hour, and then to 200° C. for a quarter of an hour. The melt is extracted while hot with caustic soda solution and the alkaline filtrate given a pH of 3 with hydrochloric acid, 1-phenyl-4,6-dihydroxy-pyrazolo[3,4-d]pyrimidine of melting point 297–299° C. being obtained. It has diuretic activity.

Example 3

8.2 parts of isopropylhydrazine are introduced into a solution of 16.9 parts of ethoxymethylenecyanoacetic acid ethyl ester in 100 parts by volume of alcohol and heated to the boil for 12 hours. The mixture is then evaporated to dryness in vacuo and the residue distilled in vacuo. 1-isopropyl-5-amino-4-carbethoxy-pyrazole of the formula

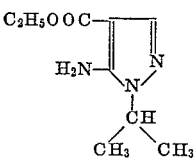

passes over at 164–166° C. under 10 mm. pressure and solidifies in crystalline form in the receiver. The colorless crystals so obtained melt at 46–48° C.

This compound can be converted into the 1-isopropyl-4-hydroxy-pyrazolo[3,4-d]pyrimidine in the following manner:

19.7 parts of 1-isopropyl-4-carbethoxy-5-amino-pyrazole are heated with 50 parts of formamide for 4 hours in a bath having a temperature of 200–210° C. After cooling, the reaction mixture is taken up in 2N-caustic soda solution, treated with animal charcoal and precipitated by adjusting the pH to 3 with 2N-hydrochloric acid. 1-isopropyl-4-hydroxy-pyrazolo[3,4-d]pyrimidine is thus obtained in the form of crystals melting at 197–198° C. From this compound, the 1-isopropyl-4-methoxy-pyrazolo[3,4-d]pyrimidine can be made in this manner.

9 parts of 1-isopropyl-4-hydroxy-pyrazolo[3,4-d]pyrimidine are dissolved in 40 parts by volume of 2N-caustic soda solution and mixed slowly, while being shaken, with 8 parts of dimethyl sulfate. A white product precipitates which is separated by filtration. On recrystallization from water there is obtained 1-isopropyl-4-methoxy-pyrazolo-[3,4-d]pyrimidine in the form of crystals melting at 162–163° C. It has diuretic activity.

Example 4

A solution of 48.8 parts of ethoxymethylene-malonitrile in 500 parts by volume of alcohol is mixed with 30 parts of isopropylhydrazine. The mixture is heated to the boil for 10 hours, evaporated to dryness in vacuo, and the residue crystallized from a large amount of isopropyl ether. 1-isopropyl-5-amino-4-cyano-pyrazole is thus obtained in the form of white crystals of melting point 94–95° C. 10 parts of the compound so obtained are mixed with 200 parts by volume of 2N-caustic soda solution and 100 parts by volume of alcohol, and the solution heated to the boil for 3 hours. The alcohol is expelled under reduced pressure, the reaction mass allowed to cool, and the precipitate separated by filtering with suction. The precipitate is recrystallized from alcohol to obtain 1-isopropyl-5-amino-4-carbamyl-pyrazole in the form of white crystals of melting point 215–216° C. This compound can be used in the following manner for the preparation of 1-isopropyl-4,6 - dioxo - 5,7 - dimethyl - 4,5,6,7 - tetrahydro - pyrazolo[3,4-d]pyrimidine.

10 parts of 1-isopropyl-5-amino-4-carbamyl - pyrazole and 20 parts of urea are mixed thoroughly and heated for one hour in a bath having a temperature of 200° C. The hot melt is then introduced into 150 parts by volume of 1N-caustic soda solution, treated with animal charcoal and filtered with suction. The filtrate is given a pH of 3 with hydrochloric acid, whereupon white crystals separate. By recrystallization of this precipitate from water there is obtained 1-isopropyl-4,6-dihydroxy-pyrazolo[3,4-d]pyrimidine in the form of white crystals of melting point 286–287° C. (decomposition).

A solution of 10 parts of 1-isopropyl-4,6-dihydroxy-pyrazolo[3,4-d]pyrimidine in 75 parts by volume of 2N-caustic soda solution is mixed slowly, while being stirred, with 14 parts of dimethyl sulfate. The mixture is allowed to stand overnight and in the morning extracted with chloroform. The residue is recrystallized from alcohol to obtain 1 - isopropyl - 4,6 - dioxo - 5,7 - dimethyl - 4,5,6,7-tetrahydro-pyrazolo[3,4-d]pyrimidine in the form of white crystals of melting point 141–142° C. This compound has diuretic activity.

Example 5

A solution of 85 parts of ethoxymethylenecyanoacetic acid ethyl ester in 500 parts by volume of alcohol is slowly mixed with 71 parts of p-chlorophenylhydrazine. When the addition is finished, the mixture is heated to the boil for 2 hours so as to complete the reaction. The reaction mass is allowed to cool and the precipitate separated by filtering with suction. By recrystallization from alcohol 1-(p-chlorophenyl)-5-amino-4-carbethoxy-pyrazole is obtained in the form of white crystals melting at 145–146° C. From this compound, 1-(p-chlorophenyl)-4-hydroxy-pyrazolo-[3,4-d]pyrimidine can be obtained as follows:

26.5 parts of 1-(p-chlorophenyl)-5-amino-4-carbethoxy-pyrazole and 100 parts by volume of formamide are heated for 8 hours in a bath having a temperature of 200–210° C. After cooling, the crystalline precipitate which has formed is separated by filtering with suction, dissolved in 2N-caustic soda solution, treated with animal charcoal, and precipitated by adjusting the pH to 3 with 2N-hydrochloric acid. By recrystallization from dimethyl formamide there is obtained 1-(p-chlorophenyl)-4-hydroxy-pyrazolo[3,4-d]pyrimidine in the form of white crystals which do not melt when heated to 300° C. It has diuretic activity.

Example 6

50.7 parts of ethoxymethylenecyanoacetic acid ethyl ester are dissolved in 400 parts by volume of ethyl alcohol. The solution is mixed slowly with 33 parts of β-hydroxy-ethylhydrazine of 70 percent strength and refluxed for 10 hours. The mixture is then evaporated to dryness and the residue distilled under a high vacuum. There is obtained, at a condensation point of 185–187° C. under a pressure of 0.1 mm., 1-(β-hydroxyethyl)-5-amino-4-carbethoxy-pyrazole of the formula

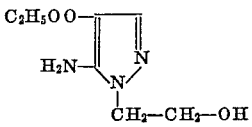

It solidifies on cooling and melts at 77–79° C.

Example 7

48.8 parts of ethoxymethylene-malonitrile are dissolved in 500 parts by volume of ethyl alcohol. The solution is slowly mixed with 44 parts of 2-hydroxy-ethylhydrazine and refluxed for 10 hours. It is then evaporated in vacuo and the residue recrystallized from ethyl alcohol. 1-(β-hydroxyethyl) - 5 - amino - 4 - cyano - pyrazole is so obtained in the form of crystals of melting point 156–158° C.

Example 8

26 parts of 1-(β-hydroxyethyl)-5-amino-4-cyano-pyrazole in a solution of 260 parts by volume of ethyl alcohol and 520 parts by volume of 2N-caustic soda solution are refluxed for 2 hours. At a water-bath temperature of not above 30–40° C., the reaction mass is then evaporated in vacuo to one-third the original volume. The residual solution is placed into a refrigerator whereupon the 1-(β-hydroxyethyl)-5-amino-4-carbamyl-pyrazole separates. It is separated by filtering with suction and recrystallized from ethyl alcohol. It melts at 181–182° C. The 1-(β-hydroxyethyl)-5-amino-pyrazoles shown in Examples 7, 8 and 9 can be converted by methods outlined hereinbefore, into 4-hydroxy or 4-amino-pyrazolo[3,4-d]pyrimidines having diuretic activity.

Example 9

21 grams of 3-hydrazino-2-methyl-butane are mixed with a solution of 24.4 grams of ethoxy-methylene-malonic acid dinitrile in 250 cc. of ethanol. The reaction mixture is then heated under reflux for 12 hours, then allowed to cool, and is filtered with suction to remove the precipitate formed. By recrystallization from ethanol there is obtained 1-[3′-methyl-butyl-(2′)]-3-amino-4-cyano-pyrazole of the formula

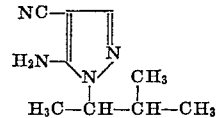

in the form of white crystals melting at 167–168° C. The 3-hydrazino-2-methyl-butane used as starting material is prepared as follows:

86 grams of methyl isopropyl ketone are added to a solution of 50 grams of hydrazine hydrate in 500 cc. of 2N-hydrochloric acid, while stirring and cooling with ice. Hydrogenation is carried out at room temperature under 19 atmospheres pressure with 2 grams of platinum oxide as catalyst. In the course of 1 hour 22.4 liters of hydrogen are absorbed, which corresponds to 1 mol. of hydrogen. The catalyst is then filtered off with suction, the filtrate is evaporated to dryness, and 500 cc. of a concentrated solution of caustic soda are added to the residue, whereupon 3-hydrazine-2-methyl - butane separates out as an oil. The oil is separated in a separating funnel, and purified by distillation. 3 - Hydrazino-2- methylbutane passes over at 39–44° C. under 11 mm. pressure.

Example 10

21 grams of 2-hydrazino-pentane are added to a solution of 24.4 grams of ethoxy-methylene-malonic acid dinitrile in 250 cc. of ethanol. The reaction mixture is then heated for 12 hours under reflux, evaporated to dryness in vacuo, and the residue is recrystallized from isopropyl ether. 1-pentyl-(2')-5-amino-4-cyano-pyrazole of the formula

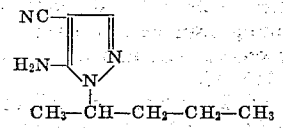

$CH_3-CH-CH_2-CH_2-CH_3$ is obtained in the form of white crystals melting at 105–107° C.

The 2-hydrazino-pentane used as starting material is prepared as follows:

86 grams of methyl propyl ketone are added to a solution of neutral reaction of 50 grams of hydrazine hydrate in 500 cc. of 2N-hydrochloric acid, while stirring and cooling with ice. Hydrogenation is then carried out at room temperature under 19 atmospheres pressure with 2 grams of platinum oxide as catalyst. In the course of 1 hour the calculated quantity of hydrogen for one mol., i.e. 22.4 liters, is taken up. The mixture is then filtered with suction to remove the catalyst, then evaporated to dryness in vacuo, and 500 cc. of concentrated sodium hydroxide solution are added to the residue, whereupon 2-hydrazino-pentane separates out as an oil. After separating the oil in a separating funnel, the oil is distilled at 56–60° C. under 11 mm. pressure.

Example 11

48.8 grams of ethoxy-methylene-malonic acid dinitrile are dissolved in 320 cc. of ethyl alcohol, and a solution of 40 grams of freshly distilled cyclopentyl-hydrazine in 80 cc. of ethanol is added. The whole is heated at the boil for 10 hours. The ethyl alcohol is then evaporated in vacuo, whereby a solid product precipitates out. This is dissolved in 80 cc. of ethyl alcohol, and 500 cc. of water are added, while stirring, whereupon 1-cyclopentyl-5-amino-4-cyano-pyrazole precipitates out in the form of crystals melting at 110–112° C. After being recrystallized once from aqueous ethanol of 40% strength the melting point is 113–114° C.

The cyclopentyl-hydrazine used as starting material is prepared as follows:

336 grams of cyclopentanone are added to a solution of 200 grams of hydrazine hydrate in 572 cc. of 7N-hydrochloric acid, while stirring and cooling with ice. Hydrogenation is then carried out at room temperature under 100 atmospheres pressure with 2 grams of platinum oxide as catalyst. In the course of 1 hour the quantity of hydrogen calculated for 4 mols., i.e. 89.6 liters, is absorbed. The catalyst is removed by filtering with suction, and the filtrate is adjusted to a pH value of 4 with 2N-hydrochloric acid, and the solution is evaporated in vacuo until crystallization begins. 500 cc. of a concentrated solution of caustic soda are then added, while cooling with ice. Solid sodium hydroxide is added until the cyclopentyl-hydrazine separates out as an oil. The latter is distilled at 60–65° C. under 11 mm. pressure. The monohydrochloride prepared in the ordinary manner melts at 131–132° C.

Example 12

150.5 grams of cyclohexyl-hydrazine hydrochloride are dissolved in 500 cc. of ethyl alcohol, and 23 grams of sodium in 400 cc. of ethyl alcohol are added, while cooling the solution. The reaction solution is then slowly added, while stirring, to a solution of 122 grams of ethoxy-methylene-malonic acid dinitrile, whereby the temperature rises to about 45° C. The mixture is then boiled for 10 hours. It is then allowed to cool, and the precipitated sodium chloride is filtered off. The filtrate is evaporated to dryness in vacuo. The residue is dissolved in 200 cc. of ethyl alcohol, then filtered, and the solution is poured into 1400 cc. of water, while stirring, whereby 1-cyclohexyl-5-amino-4-cyano-pyrazole precipitates in the form of crystals melting at 124–126° C.

The cyclohexyl-hydrazine hydrochloride used as starting material is prepared as follows:

392 grams of cyclohexanone are added to a solution of 200 grams of hydrazine hydrate in 572 cc. of 7N-hydrochloric acid, while stirring and cooling with ice. Hydrogenation is then carried out at room temperature under 100 atmospheres pressure with 2 grams of platinum oxide as catalyst. In the course of 30 minutes the quantity of hydrogen calculated for 4 mols., i.e. 89.6 liters, is absorbed. 1000 cc. of ethyl alcohol are added to dissolve the precipitated crystals. The catalyst is then filtered off with suction, and the filtrate is adjusted to a pH value of 4 and concentrated in vacuo until crystallization begins. After cooling the mixture the precipitated crystals are filtered off, and 500 cc. of a concentrated solution of caustic soda are added to the filtrate while cooling with ice. Further solid sodium hydroxide is added until the cyclohexyl-hydrazine separates out as an oil. The oils are distilled at 77–80° C. under 12 mm. pressure. The distillate so obtained is immediately converted into its hydrochloride by reaction with alcoholic hydrochloric acid, melting point 112–113° C.

Example 13

12.2 grams of ethoxy-methylene-malonic acid dinitrile are dissolved in 200 cc. of ethyl alcohol, and 10.1 grams of pentyl-(3')-hydrazine are added. The whole is heated at the boil for 12 hours. The ethyl alcohol is then evaporated in vacuo, whereby a solid product precipitates out. The latter is recrystallized from ethyl alcohol, and the resulting 1-[pentyl-(3')]-5-amino-4-cyano-pyrazole of the formula

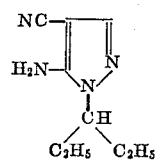

is obtained in the form of crystals melting at 140–141° C.

The pentyl-(3')-hydrazine used as starting material is prepared as follows:

344 grams of diethylketone are added to a solution of 200 grams of hydrazine hydrate in 528 cc. of 7.57N-hydrochloric acid, while stirring and cooling with ice. After adding 270 cc. of ethanol, stirring is continued for 30 minutes. Hydrogenation is then carried out at room temperature under 130 atmospheres pressure with 2 grams of platinum oxide as catalyst. In the course of 15 minutes the quantity of hydrogen calculated for 4 mols., i.e. 89.6 liters, is absorbed. The catalyst is filtered off with suction, and the filtrate is adjusted with 2N-hydrochloric acid to a pH value of 4 and concentrated in vacuo until crystallization begins. 500 cc. of a concentrated solution of caustic soda are then added while cooling with ice. Solid sodium hydroxide is also added until the isopentyl-hydrazine separates out as an oil. The oil is decanted off, and dried over sodium hydroxide and distilled. Pentyl-(3')-hydrazine passes over between 48° and 50° C. under 11 mm. of pressure. The monohydrochloride prepared in the usual manner melts at 73–75° C.

Example 14

122 grams of ethoxy-methylene-malonic acid dinitrile are dissolved in 800 cc. of ethyl alcohol, and a solution of 88 grams of secondary-butyl-hydrazine in 200 cc. of ethyl alcohol is added. The whole is boiled for 10 hours.

The ethyl alcohol is then evaporated in vacuo, whereupon a solid product precipitates out. The latter is recrystallized from ethyl alcohol and 1-(butyl-2')-amino-4-cyano-pyrazole of the formula

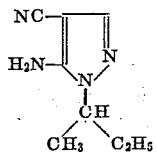

is obtained in the form of crystals melting at 147–148° C.

The secondary-butyl-hydrazine used as starting material is prepared as follows:

288 grams of ethyl methyl ketone are added to a solution of 200 grams of hydrazine hydrate in 572 cc. of 7N-hydrochloric acid while stirring and cooling with ice. Hydrogenation is then carried out at room temperature under 100 atmospheres pressure with 1 grams of platinum oxide as catalyst. In the course of 45 minutes the quantity of hydrogen calculated for 4 mols., i.e., 89.6 liters, is absorbed. The catalyst is removed by filtering with suction, the filtrate is adjusted to a pH value of 4 with 2N-hydrochloric acid, and the solution is concentrated in vacuo until crystallization begins. 500 cc. of a concentrated solution of caustic soda are then added while cooling with ice. Solid sodium hydroxide is also added until the secondary butylhydrazine separates out as an oil. The oil is decanted off, dried over sodium hhydroxide, and the secondary-butyl-hydrazine is distilled over at a temperature between 104° C. and 108° C.

Example 15

24.4 grams of ethoxymethylene malonic acid dinitrile are dissolved in 160 cc. of absolute alcohol, and a solution of 80% strength of 32.6 grams of heptyl-(2)-hydrazine in 40 cc. of absolute alcohol is added. The whole is then boiled under reflux for 10 hours. The reaction solution is extensively concentrated, water is added, whereupon crystals separate. The latter are suction-filtered and recrystallized from aqueous alcohol. There is obtained 1-(heptyl-2')-5-amino-4-cyano-pyrazole of the formula

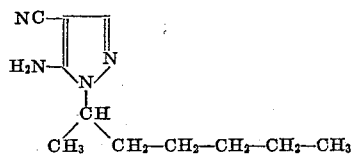

melting at 94–96° C.

The heptyl-(2)-hydrazine used as starting material can be prepared as follows:

314 grams of 2-oxo-heptane are added to a solution of 136 grams of hydrazine hydrate in 400 cc. of 6.9N-hydrochloric acid with stirring and ice-cooling. The solution is kept homogenous by adding alcohol. Hydrogenation is then carried out at room temperature under 67.5 atmospheres gauge pressure with 2 grams of platinum oxide as catalyst. Within 2¼ hours the quantity of hydrogen calculated for 2.76 mols., 61.8 liters, is taken up. The catalyst is filtered off, the filtrate is adjusted to pH 4 with 2N-hydrochloric acid and is evaporated under reduced pressure. 300 cc. of concentrated sodium hydroxide solution are added with ice-cooling and then solid sodium hydroxide until an oil separates. The latter is fractionated under a water jet vacuum. There is obtained heptyl-(2)-hydrazine in the form of an oil boiling at 75–78° C. under 15 mm. of pressure.

Example 16

392 grams of cyclohexanone are added to a solution of 200 grams of hydrazine hydrate in 572 cc. of 7N-hydrochloric acid with stirring and ice-cooling. Hydrogenation is then carried out at room temperature and under 100 atmospheres pressure with 2 grams of platinum oxide as catalyst. Within 30 minutes the quantity of hydrogen calculated for 4 mols., 89.6 liters, is taken up. 1000 cc. of ethyl alcohol are added in order to dissolve the precipitated crystals. The catalyst is then filtered off with suction, the filtrate is adjusted to pH 4 and evaporated in vacuo until crystallization sets in. After cooling, the precipitated crystals are filtered and the filtrate mixed with 500 cc. of concentrated sodium hydroxide solution with ice-cooling. Solid sodium hydroxide is then added until cyclohexylhydrazine separates as an oil. The latter distils at 77–80° under 12 mm. of pressure. The resulting distillate is reacted immediately with alcoholic hydrochloric acid into the hydrochloride, melting point 112–113° C.

A solution of 2.3 grams of sodium in 40 cc. of absolute ethanol is added to a solution of 15.05 grams of cyclohexylhydrazine hydrochloride in 50 cc. of absolute ethanol. 16.9 grams of ethoxy-methylene-cyanoacetic acid ethyl ester, dissolved in 20 cc. of ethanol are added to the reaction solution, and the whole is heated for 10 hours at the boil. After cooling the mixture, the precipitated sodium chloride is filtered off with suction, and the filtrate is evaporated to dryness. The crystalline residue is triturated with water and filtered with suction. There is obtained 1-cyclohexyl-5-amino - 4 - carbethoxy - pyrazole melting at 112–114° C. After being recrystallized from petroleum ether the melting point of the product rises to 115–116° C.

By reaction with formamide this compound is converted to 1 - cyclohexyl - 4 - hydroxy - pyrazole[3,4-d] pyrimidine which by treatment with phosphorus oxychloride and exchange of the chlorine atom in 4-position for a diethylamino group is converted to 1-cyclohexyl-4 - diethylamino-pyrazolo[3,4 - d]pyrimidine melting at 78–79° C.

Example 17

16.9 grams of ethoxy-methylene-cyanoacetic acid ethyl ester and 8.8 grams of secondary-butyl-hydrazine are heated in 100 cc. of absolute ethanol for 10 hours at the boil. The mixture is then evaporated in vacuo, and the residue is distilled in vacuo. 1-(secondary-butyl)-5-amino-4-carbethoxy-pyrazole of the formula

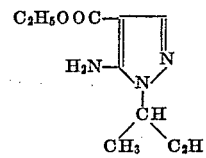

boils under 0.09 mm. pressure at 105–107° C.

By reaction with formamide, chlorination with phosphorus oxychloride and treatment with diethylamine this compound can be converted into 1-(secondary butyl)-4-diethylamino-pyrazolo[3,4-d]pyrimidine boiling at 116–118° C. under a pressure of 0.08 mm.

Example 18

200 cc. of 2N-sodium hydroxide solution and 100 cc. of alcohol are added to 18 grams of 1-[3'-methyl-butyl-(2')]-5-amino-4-cyano-pyrazole and the solution heated at the boil for 3 hours. The alcohol is evaporated under reduced pressure, the reaction mixture allowed to cool and the precipitated suction-filtered. The latter is recrystallized from alcohol and there is obtained 1-[3'-methyl-butyl-(2')]-5-amino-4-carbamyl-pyrazole of the formula

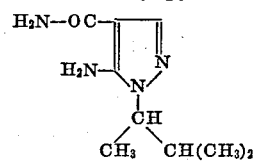

in the form of white crystals melting at 227–228° C.

The 1-[3'-methyl-butyl-(2')]-4-diethylamino-pyrazolo

[3,4-d]pyrimidine obtained therefrom in a way similar to that described in Example 16 give hydrochloride of melting point 184–185° C.

Example 19

84.5 grams of ethoxymethylene cyanacetic acid ethyl ester and 51 grams of pentyl-3-hydrazine are heated to the boil in 500 cc. of absolute alcohol for 10 hours. The whole is evaporated under reduced pressure and the residue distilled in vacuo. 1-pentyl-(3')-5-amino-4-carbethoxy-pyrazole boils at 175° C. under 11 mm. of pressure.

The 1-pentyl-(3') - 4 - diethylamino-pyrazolo[3,4-d]pyrimidine obtainable therefrom boils at 118–120° C. under 0.15 mm. of pressure.

Example 20

67.6 grams of ethoxymethylene cyanacetic acid ethyl ester and 40 grams of cyclopentylhydrazine are boiled under reflux in 400 cc. of absolute alcohol for 10 hours. The solution is evaporated in vacuo and the residue distilled in high vacum. 1-cyclopentyl-5-amino-4-carbethoxy-pyrazole boils at 152° C. under 0.15 mm. of pressure. The melting point of the compound is 64–66° C.

The 1 - cyclopentyl-4-diethylamino-pyrazolo[3,4-d]pyrimidine obtained therefrom boils at 136–138° C. under 0.05 mm. of pressure.

Example 21

57 grams of 1-cyclohexyl-5-amino-4-cyano-pyrazole are boiled under reflux for 2½ hours in 230 cc. of absolute alcohol and 230 cc. of 2N-sodium hydroxide solution. After cooling, the crystals are suction-filtered. There is obtained 1-cyclo-hexyl-5-amino-pyrazole-4-carboxylic acid amide melting at 267–268° C.

By reaction with urea, chlorination and treatment with dimethylamine there can be obtained 1-cyclohexyl-4,6-bis - dimethylamino - pyrazolo[3,4-d]pyrimidine, melting point 169–170° C.

Example 22

75 grams of 1-secondary butyl-5-amino-4-cyano-pyrazole are boiled under reflux for 2½ hours in 750 cc. of absolute alcohol and 1500 cc. of 2N-sodium hydroxide solution. The solution is then concentrated to a volume of about 1000 cc. in vacuo at a temperature of 50° C. and then cooled to 0° C. The separated crystals are filtered off. There is obtained 1-secondary butyl-5-amino-pyrazole-4-carboxylic acid amide melting at 198–199° C.

This can be converted as outlined in Example 21 into 1-secondary butyl-4:6-bis-dimethylamino-pyrazolo[3,4-d] pyrimidine melting at 113–114° C.

Example 23

A solution of 11.6 grams of N₁-isopropyl-N₂-acetyl-hydrazine and 17 grams of ethoxymethylene-cyanacetic acid ester, in 250 cc. of ethanol is boiled for 12 hours under reflux. The ethanol is then evaporated in vacuo, 150 cc. of 8N-alcoholic hydrochloric acid are added to the oily residue containing β-(N₂-acetyl-N₁-isopropyl-hydrazino)-α-cyano-acrylic acid ethyl ester, and the whole is boiled under reflux for 2 hours. The mixture is again evaporated in vacuo, the residue is taken up in 2N-aqueous hydrochloric acid, the solution is filtered to remove undissolved material, and its pH value is adjusted to 8 to 9 with caustic soda solution. The mixture is then extracted with chloroform and the residue obtained by evaporating chloroform is recrystallized from cyclohexane. There is obtained 1-isopropyl-3-amino-4-carbethoxy-pyrazole of the formula

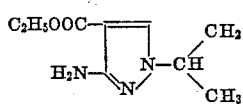

in the form of white crystals melting at 72–73° C.

Example 24

A solution of 65 grams of N₁-methyl-N₂-benzylidene-hydrazine and 85 grams of ethoxymethylene-cyanoacetic acid ester in 500 cc. of benzene is boiled under reflux for 10 hours. There is formed a precipitate which is filtered off and recrystallized from ethanol. There is obtained β-(N₂ - benzylidene-N₁-methyl-hydrazino)-α-cyano-acrylic acid ethyl ester in the form of slightly yellow crystals melting at 155–156° C.

80 grams of β-(N₂-benzylidene-N₁-methyl-hydrazino)-α-cyano-acrylic acid ethyl ester are boiled under reflux for 2 hours with 10N-alcoholic hydrochloric acid. The solvent is then removed by distillation in vacuo. The residue is taken up in 200 cc. of 2N-hydrochloric acid and the acid solution is extracted by agitation with ether. After separating the aqueous layer, the latter is rendered alkaline by the addition of 2N-solution of caustic soda. The precipitated base is extracted by repeated agitation with ether. The ethereal extract is separated, dried, the ether is evaporated, and the residue is distilled at 130° C. under 0.01 mm. pressure. The resulting 1-methyl-3-amino-4-carbethoxy-pyrazole of the formula

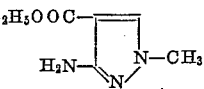

melts at 92–93° C.

Example 25

8 grams of N₁-isopropyl-N₂-benzylidene-hydrazine and 8 grams of ethoxymethylene-cyanacetic acid ester are heated in 50 cc. of benzene for 10 hours at 80° C. After removing the solvent in vacuo, the residue is recrystallized from ethanol. There is obtained β-(N₂-benzylidene-N₁-isopropyl-hydrazino)-α-cyanoacrylic acid ethyl ester in the form of yellow prisms melting at 118—120° C.

4 grams of β-(N₂-benzylidene-N₁-isopropyl-hydrazino)-α-cyano-acrylic acid ethyl ester are boiled for 2 hours with 10N-alcoholic hydrochloric acid and then the alcohol is removed by distillation in vacuo. The residue is taken up in 200 cc. of 2N-hydrochloric acid, and the solution is extracted with ether. After separating the aqueous solution, the latter is rendered alkaline by the addition of a 2N-solution of caustic soda. The precipitated base is extracted with ether. After drying the ethereal extract and evaporating the ether, a residue consisting of 1-isopropyl-3-amino-4-carbethoxy-pyrazole of the formula

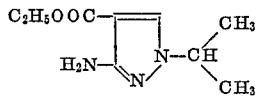

is obtained, which is recrystallized from cyclohexane to form white lamellae melting at 72–73° C.

In a similar manner, 1-ethyl-3-amino-4-carbethoxypyrazole boiling at 111° C. under 0.06 mm. pressure can be obtained.

Example 26

10 grams of 1-isopropyl-3-amino-4-carbethoxy-pyrazole are heated with 100 cc. of 2N-sodium hydroxide solution for 2 hours at the boil. The pH is then adjusted to 3–4 with 6N-hydrochloric acid and the precipitate is suction-filtered. By recrystallization from ethanol there is obtained 1-isopropyl-3-amino-4-carboxy-pyrazole of the formula

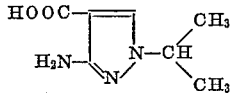

in the form of white crystals melting at 141–142° C. with decarboxylation.

Example 27

To a solution of 122 grams of ethoxy-methylenemalonitrile in 150 cc. of benzene there are added 134 grams of $N_1$-methyl-$N_2$-benzylidene-hydrazine. After being allowed to stand for a short time at room temperature, a precipitate is formed which is filtered and recrystallized from ethanol. There is obtained $\beta$ - ($N_2$ - benzylidene - $N_1$-methyl-hydrazino)-$\alpha$-cyano-acrylic acid nitrile in crystals melting at 218° C.

50 grams of $\beta$-($N_2$-benzylidene-$N_1$-methyl-hydrazino)-$\alpha$-cyano-acrylic acid nitrile are boiled under reflux with 30 cc. of concentrated hydrochloric acid in 400 cc. of ethanol for 30 minutes. After evaporating the solvent in vacuo, 200 cc. of ether are added to the residue and the crystalline precipitate is filtered. 50 cc. of 10N-sodium hydroxide solution are then added to the latter and it is then extracted several times with chloroform. After drying and evaporating the chloroform extract, the residue is recrystallized from methylene chloride-petroleum ether. There is obtained 1-methyl-3-amino-4-cyano-pyrazole of the formula

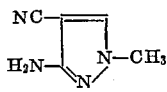

in the form of crystals melting at 135–136° C.

Example 28

105 grams of $N_1$ - isopropyl-$N_2$-benzylidene-hydrazine and 89 grams of ethoxymethylene-malonitrile are boiled under reflux in 300 cc. of ethanol for 8 hours. After being left to stand for some time at room temperature faintly yellow crystals precipitate which are recrystallized from ethanol. There is obtained $\beta$-($N_2$-benzylidene-$N_1$-isopropyl-hydrazino)-$\alpha$-cyano-acrylic acid nitrile melting at 152° C.

30 grams of $\beta$ - ($N_2$ - benzylidene - $N_1$-isopropyl-hydrazino)-$\alpha$-cyano-acrylic acid nitrile are boiled with 15 cc. of concencentrated hydrochloric acid and 150 cc. of ethanol for 20 minutes. The solvent is then removed in vacuo and ether is added to the residue. Crystals precipitate which are filtered with suction and washed with ether. To the crystalline residue there are added 15 cc. of 10N-sodium hydroxide solution, and the mixture is extracted with chloroform. After drying and evaporating the extract, a solid residue remains which is recrystallized from water. There is obtained 1-isopropyl-3-amino-4-cyano-pyrazole of the formula

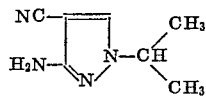

melting at 97° C.

Example 29

A solution of 10 grams of 1-methyl-3-amino-4-cyano-pyrazole in 30 cc. of ethanol and 30 cc. of 2N-sodium hydroxide solution is boiled under reflux for 3 hours. The solvent is then evaporated in vacuo and the residue recrystallized from ethanol. There is obtained 1-methyl-3-amino-4-carbamyl-pyrazole of the formula

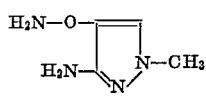

in the form of white prisms which melt at 178° C. after sublimation in high vacuum.

Example 30

152 grams of $\beta$-hydroxy-ethyl-hydrazine and 212 grams of benzaldehyde are boiled in 400 cc. of benzene in a water separator until 36 cc. of water have separated off. 338 grams of ethoxymethylene-cyano-acetic acid ethyl ester are then added and the whole is boiled for 6 hours. On cooling, $\beta$-[$N_2$-benzylidene-$N_1$-($\beta$-hydroxy-ethyl)-hydrazino]-$\alpha$-cyano-acrylic acid ethyl ester melting at 159° C. separates.

29 grams of this ester are boiled under reflux with 11 cc. of concentrated hydrochloric acid in 100 cc. of ethanol for 30 minutes. The solvent is then evaporated and the residue washed with ether. There remains a crystalline mass which, after adding 2N-sodium hydroxide solution, is extracted with ether. After drying and evaporating the solvent, an oil remains which crystallizes after standing for some time. By recrystallization from benzene there is obtained 1 - ($\beta$ - hydroxy-ethyl)-3-amino-4-carbethoxy-pyrazole of the formula

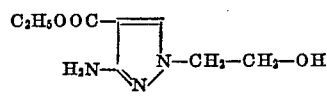

in the form of crystals melting at 75° C.

Example 31

49 grams of $N_1$-phenyl-$N_2$-benzylidene-hydrazine and 42 grams of ethoxymethylene-cyanacetic acid ethyl ester are heated for 8 hours at 180° C. without any solvent. The solid reaction product is recrystallized from ethanol. There is obtained $\beta$ - ($N_2$ - benzylidene-$N_1$-phenyl-hydrazino)-$\alpha$-cyano-acrylic acid ethyl ester in the form of faintly yellow crystals melting at 180° C.

10 grams of this ester are boiled with 4 cc. of concentrated hydrochloric acid in 100 cc. of ethanol. The solvent is then evaporated in vacuo. To the residue is added 10N-sodium hydroxide solution, and the reaction mass is extracted with ether. After drying and evaporating the solvent, a crystalline residue remains which is purified by sublimation. There is obtained 1-phenyl-3-amino-4-carbethoxy-pyrazole of the formula

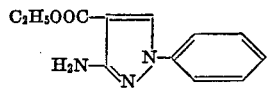

in the form of crystals melting at 105° C.

Example 32

35 grams of 2-hydrazinopyridine and 55 grams of ethoxymethylene-cyanacetic acid ethyl ester are boiled under reflux in 200 cc. of ethanol for 6 hours. On cooling, crystals separate which are purified by crystallization from ethanol. In this manner there is obtained 1-pyridyl-(2')-5-amino-4-carbethoxypyrazole melting at 98° C.

Example 33

A suspension of 10 grams of ethylhydrazine-oxalate in 130 cc. of absolute alcohol is added to 11.25 grams of ethoxymethylene-cyanacetic ester, dissolved in 30 cc. of absolute alcohol, and the mixture boiled under reflux while being stirred for 10 hours. After cooling, the reaction solution is filtered and the filtrate evaporated. The residue is mixed with 2N-sodium hydroxide solution and extracted several times with ether. The ethereal solution is evaporated and the residue subjected to fractional distillation under a high vacuum. There is obtained in this manner the 1-ethyl-5-amino-4-carbethoxy-pyrazole

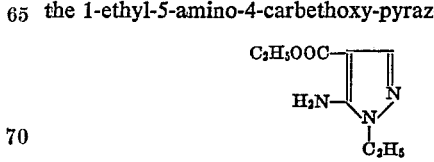

which under a pressure of 0.6 mm. boils at 120–121° C.

What is claimed is:
1. 3-unsubstituted 1-R-5-amino-4-carbo - lower alkoxy- pyrazole, wherein R represents a member of the group consisting of lower alkyl, cycloalkyl having from 5 to 6 carbon atoms, lower alkoxyalkyl, halophenyl, lower alkylphenyl, nitrophenyl and pyridyl.

2. 1-lower alkyl-5-amino-4-carbo-lwer alkoxy-pyrazole.
3. 1-isopropyl-5-amino-4-carbethoxy-pyrazole.

References Cited
UNITED STATES PATENTS

| | | | |
|---|---|---|---|
| 2,467,926 | 4/1949 | Ardis | 260—465.4 |
| 2,669,575 | 2/1954 | Solonen et al. | 260—465 |
| 2,759,949 | 8/1956 | Hitchings et al. | 260—310 |
| 2,794,788 | 6/1957 | Coover et al. | 260—465 |
| 2,868,803 | 1/1959 | Druey et al. | 260—310 |
| 2,914,551 | 11/1959 | Kartins et al. | 260—165 |
| 2,993,891 | 7/1961 | Zimmer et al. | 260—240 |
| 3,074,971 | 1/1963 | Strobel et al. | 266—465 |
| 3,099,679 | 7/1963 | Elam et al. | 260—464 |
| 3,158,620 | 11/1964 | Klingsberg | 260—310 |
| 3,179,651 | 4/1965 | Stacey | 260—465 |
| 3,187,006 | 6/1965 | Druey et al. | 260—310 |

OTHER REFERENCES

Elderfield, Heterocyclic Compounds, vol. 5, p. 119, New York, Wiley, 1957.

Cheng et al., American Chemical Society, Abstracts of Papers 129th Meeting, April 8 to 13, 1956, title page and pps. 4N–5N. Wash. Amer. Chem. Soc., 1956.

Cheng et al., Jour. Org. Chem., vol. 21, pp. 1240–1256 (1956).

Conant et al., The Chemistry of Organic Compounds, 3rd ed., p. 183, New York, Macmillan, 1947.

Diels et al., Berichte, vol. 55, pp. 3439–48 (1922).

Karrer, Organic Chemistry, 2nd English ed., p. 178, New York, Elsevier, 1946.

Migrdichian, Organic Synthesio, vol. 6, p. 429, New York, Reinhold, 1957.

Passalacqua, Gaz. Chim., Italiana, vol. 45, part 2, pp., 556–69 (1913).

HENRY R. JILES, *Primary Examiner.*

WALTER A. MODANCE, N. TROUSOF,
*Assistant Examiners.*

UNITED STATES PATENT OFFICE
CERTIFICATE OF CORRECTION

Patent No. 3,408,362                                                       October 29, 1968

Jean Druey et al.

It is certified that error appears in the above identified patent and that said Letters Patent are hereby corrected as shown below:

Column 1, line 40, "α-cyano-α-acetic" should read -- α-cyano-α-formyl-acetic --; line 59, "mono-heterocycl-" should read -- mono-heterocyclyl- --. Column 2, lines 10 to 15, the left-hand portion of the formula should appear as shown below:

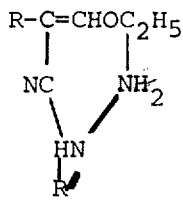

Column 5, line 27, "hydroxyl-pyrazolo" should read -- hydroxy-pyrazolo --. Column 11, line 3, "1-(butyl-2')-amino-4-" should read -- 1-(butyl-2')-5-amino-4- --; line 19, "1 grams" should read -- 2 grams --; line 29, "hhydroxide" should read -- hydroxide --. Column 13, line 25, "obtained" should read -- obtainable --; lines 70 to 74, the formula should appear as shown below:

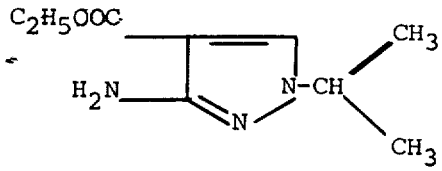

Column 15, lines 62 to 65, the formula should appear as shown below:

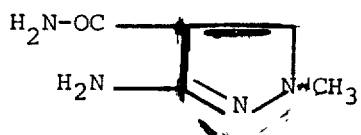

Column 17, line 5, "carbo-lwer" should read -- carbo-lower --.

Signed and sealed this 7th day of April 1970.

(SEAL)
Attest:

EDWARD M.FLETCHER,JR.                                          WILLIAM E. SCHUYLER, JR.
Attesting Officer                                                          Commissioner of Patents

CASE 3527/1+2/R/B/4006/1+2
4044/DIV

PO-1050
(5/69)

UNITED STATES PATENT OFFICE
CERTIFICATE OF CORRECTION

Patent No. 3,408,362     Dated October 29, 1968

Inventor(s) Jean Druey and Paul Schmidt

It is certified that error appears in the above-identified patent and that said Letters Patent are hereby corrected as shown below:

Column 2, the left-hand side of the formula should read:

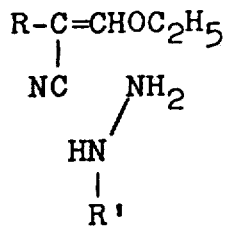

SIGNED AND
SEALED

JUL 7 1970

(SEAL)
Attest:

Edward M. Fletcher, Jr.
Attesting Officer

WILLIAM E. SCHUYLER, JR.
Commissioner of Patents